US008511748B2

(12) United States Patent
McLeod et al.

(10) Patent No.: US 8,511,748 B2
(45) Date of Patent: Aug. 20, 2013

(54) VEHICULAR SEAT BACK ASSEMBLY

(75) Inventors: David G. McLeod, Rochester, MI (US); Ashish Kotnis, Rochester Hills, MI (US); Keith L. Kauffman, Ypsilantl, MI (US); Mostaffa Ahmed, Rochester Hills, MI (US); Padraig Naughton, Terneuzen (NL)

(73) Assignee: Styron Europe GmbH, Horgen (CH)

( * ) Notice: Subject to any disclaimer, the term of this patent is extended or adjusted under 35 U.S.C. 154(b) by 214 days.

(21) Appl. No.: 12/992,191

(22) PCT Filed: May 15, 2009

(86) PCT No.: PCT/US2009/044061
§ 371 (c)(1),
(2), (4) Date: Feb. 4, 2011

(87) PCT Pub. No.: WO2009/154909
PCT Pub. Date: Dec. 23, 2009

(65) Prior Publication Data
US 2011/0121628 A1    May 26, 2011

Related U.S. Application Data

(60) Provisional application No. 61/056,485, filed on May 28, 2008.

(51) Int. Cl.
*B60N 2/42* (2006.01)
*A47C 7/02* (2006.01)

(52) U.S. Cl.
USPC .............. 297/216.1; 297/216.13; 297/452.14; 297/452.18; 297/452.2

(58) Field of Classification Search
USPC ............... 297/216.1, 216.13, 452.14, 452.18, 297/452.2
See application file for complete search history.

(56) References Cited

U.S. PATENT DOCUMENTS

| 2,657,739 | A | | 11/1953 | McCarty |
| 4,123,105 | A | | 10/1978 | Frey et al. |
| 4,493,505 | A | | 1/1985 | Yamawaki et al. |
| 5,029,942 | A | * | 7/1991 | Rink ........................ 297/452.18 |

(Continued)

FOREIGN PATENT DOCUMENTS

| DE | 3046427 A1 | 7/2001 |
| EP | 1286852 B1 | 8/2005 |

(Continued)

OTHER PUBLICATIONS

PCT/US2009/044061 Written Opinion dated Oct. 28, 2009.

(Continued)

*Primary Examiner* — Rodney B White
(74) *Attorney, Agent, or Firm* — The Dobrusin Law Firm, PC (57) ABSTRACT

A molded plastic seat back assembly for a vehicle including at least two polymeric vertical support members including a top portion, a center portion, and a lower portion, wherein at least a portion of the polymeric vertical support members have a alternating wall section portion including a front wall section, a connective middle wall section and a back wall section; at least one cross-seat member connectively disposed between the polymeric vertical support members; at least one recliner bracket connectively disposed to the lower portion of the polymeric vertical support members for anchoring the molded plastic seat back assembly to a seat back recliner assembly; and at least one strap reinforcement member.

18 Claims, 5 Drawing Sheets

(56) References Cited

U.S. PATENT DOCUMENTS

| | | | |
|---|---|---|---|
| 5,108,151 A | | 4/1992 | Peters et al. |
| 5,219,202 A | * | 6/1993 | Rink et al. ............... 297/216.13 |
| 5,240,310 A | * | 8/1993 | Rink ........................ 297/452.18 |
| 5,441,331 A | | 8/1995 | Vento |
| 5,564,785 A | * | 10/1996 | Schultz et al. .............. 297/452.2 |
| 5,636,901 A | * | 6/1997 | Grilliot et al. ........... 297/452.18 |
| 5,645,316 A | * | 7/1997 | Aufrere et al. ........... 297/216.13 |
| 5,685,614 A | * | 11/1997 | Chabanne .................. 297/452.2 |
| 5,722,731 A | * | 3/1998 | Chang .................... 297/452.2 X |
| 5,782,537 A | * | 7/1998 | Leistra et al. ......... 297/452.18 X |
| 5,971,490 A | * | 10/1999 | Chang .................... 297/452.2 X |
| 5,984,419 A | * | 11/1999 | Partington et al. ... 297/452.18 X |
| 5,988,756 A | * | 11/1999 | Aufrere et al. ........... 297/452.18 |
| 6,010,195 A | * | 1/2000 | Masters et al. ......... 297/452.2 X |
| 6,322,148 B1 | * | 11/2001 | Kolena et al. .............. 297/452.2 |
| 6,386,638 B1 | * | 5/2002 | Strauch ..................... 297/452.18 |
| 6,491,346 B1 | | 12/2002 | Gupta et al. |
| 6,688,700 B2 | | 2/2004 | Gupta et al. |
| 6,739,673 B2 | | 5/2004 | Gupta et al. |
| 6,783,184 B2 | | 8/2004 | DiBattista et al. |
| 6,997,515 B2 | | 2/2006 | Gupta et al. |
| 7,128,373 B2 | | 10/2006 | Kurtycz et al. |
| 7,137,670 B2 | | 11/2006 | Gupta et al. |
| 7,250,091 B2 | | 7/2007 | Gupta et al. |
| 7,377,586 B2 | * | 5/2008 | Evans ................... 297/452.18 X |
| 7,891,740 B2 | * | 2/2011 | Boes ........................ 297/452.18 |
| 2001/0030455 A1 | | 10/2001 | Craft et al. |
| 2005/0168041 A1 | | 8/2005 | Glance et al. |
| 2008/0011429 A1 | | 1/2008 | Gupta et al. |

FOREIGN PATENT DOCUMENTS

| | | |
|---|---|---|
| FR | 2771699 A1 | 8/2001 |
| JP | 2004016710 A | 1/2004 |
| JP | 2004322881 A | 11/2004 |
| JP | 2005342025 A | 12/2005 |
| WO | 2006047366 A | 5/2004 |

OTHER PUBLICATIONS

PCT/US2009/044061 International Preliminary Examination Report dated Sep. 12, 2009.

* cited by examiner

VEHICULAR SEAT BACK ASSEMBLY

CLAIM OF BENEFIT OF FILING DATE

The present application claims the benefit of the filing date of PCT application Serial No. PCT/US2009/044061 (filed May. 15, 2009) (Published as WO 2009/154909); U.S. Provisional Application Ser. No. 61/056,485 (filed May. 28, 2008) the contents of which are hereby incorporated by reference in their entirety.

FIELD OF THE INVENTION

The present invention relates to an improved seating system and more particularly to an improved system for an improved molded plastic seat back assembly for vehicle seating.

BACKGROUND

Efforts to improve vehicle seat backs have received increased attention in recent years in view of more rigid governmental standards for strength and a desire to lower the mass of the vehicle. The ability to address this need with a cost effective and generally lightweight material selection has resulted in a number of seat back developments as exemplified in U.S. Pat. Nos. 6,491,346; 6,688,700; 6,739,673; 6,997,515, 7,128,373 and 7,137,670; incorporated by reference. Notwithstanding these advancements, there remains a desire to present alternative solutions for various applications, particularly for front seat back (e.g. bucket seat) applications. Those applications impose unique design constraints because of package limitations and OEM and Governmental requirements (e.g. FMVSS 202 and 207/210).

SUMMARY OF THE INVENTION

The present invention is directed to one such solution, and particularly is directed to a molded plastic seat back having a at least two polymeric vertical support members, at least one cross-seat member disposed between the polymeric vertical support members for connecting them to each other, at least one recliner bracket connectively disposed to the lower portion of the polymeric vertical support members for anchoring the molded plastic seat back assembly to a seat back recliner assembly, and at least one strap reinforcement member connected to the polymeric vertical support members. One potential advantage of the present invention (including each of the aspects described in the following discussion) is the ability to employ plastics and plastic/metal combinations heretofore regarded as less practical for seat back applications that require more stringent loading requirements. Additionally, the invention affords the ability to selectively improve local properties and reduce wall thickness and section thickness. Advantageously, the seat back assembly has a displacement of less than about 10 mm with a 400 N perpendicular load applied at a lateral center-point of seat back assembly within about 20 mm of the top of the seat. The system is easy to manufacture and will not add substantial weight to the vehicle as compared with other commercial seating systems.

Accordingly, pursuant to one aspect of the present invention, there is contemplated a molded plastic seat back assembly for a vehicle including at least two polymeric vertical support members including a top portion, a center portion, and a lower portion, wherein at least a portion of the polymeric vertical support members have a alternating wall section portion including a front wall section, a connective middle wall section and a back wall section. At least one cross-seat member is connectively disposed between the polymeric vertical support members that includes a cross-seat member center portion connectively disposed between the polymeric vertical support members at the center portion of the polymeric vertical support members; at least two cross-seat member diagonal support portions connectively disposed between the polymeric vertical support members at the top portion and the center portion of the polymeric vertical support members at or below an interface section of the center cross-seat member center portion and the polymeric vertical support members; and a cross-seat member lower portion connectively disposed between the polymeric vertical support members at the lower portion of the polymeric vertical support members. At least one recliner bracket connectively disposed to the lower portion of the polymeric vertical support members for anchoring the molded plastic seat back assembly to a seat back recliner assembly; and at least one strap reinforcement member connected on to the polymeric vertical support members at least in the back wall section, wherein the at least one strap reinforcement member spans a portion of the lower portion of the polymeric vertical support members to a portion of the center portion of the polymeric vertical support members.

This or any other aspect of the invention may be further characterized by one or any combination of the features described herein, such as the at least one cross-seat member is substantially polymeric; the molded plastic seat back assembly has a displacement of less than about 10 mm with a 400 N perpendicular load applied at a center-point of the cross-seat member upper portion; the at least one strap reinforcement member is substantially metallic; the at least one strap reinforcement member is connected to the polymeric vertical support members by an adhesive; the polymeric vertical support members at the top portion includes at least one head restraint locator; a top end of the at least two diagonally extending support structure is coextensive with the at least one head restraint locator; an air-permeable channel is formed between the at least one strap reinforcement member and the polymeric vertical support members; the at least one strap reinforcement member is at least partially a c-section and further at least a portion of the strap reinforcement member is adhesively connected to the polymeric vertical support members on at least two sides of the c-section.

Accordingly, pursuant to another aspect of the present invention, there is contemplated an injection molded plastic seat back assembly for an automotive vehicle, including at least two polymeric vertical support members including a top portion, a center portion, and a lower portion, at least a portion of the polymeric vertical support members have a alternating wall section portion including a front wall section, a connective middle wall section and a back wall section; a center cross-seat member connectively disposed between the polymeric vertical support members at the center portion of the polymeric vertical support members; at least two diagonally extending support structure connectively disposed between the polymeric vertical support members at the top portion and the center portion of the polymeric vertical support members at or below an interface section of the center cross-seat member and the polymeric vertical support members; a lower cross-seat member connectively disposed between the polymeric vertical support members at the lower portion of the polymeric vertical support members; at least one recliner bracket connectively disposed to the lower portion of the polymeric vertical support members for anchoring the injection molded plastic seat back assembly to a seat back recliner assembly; and at least one strap reinforcement member adhesively connected to the polymeric vertical support members at least in the back wall section, the at least one strap reinforcement member spans a portion of the lower portion of the polymeric vertical support members to a portion of the center portion of the polymeric vertical support members; the injection molded plastic seat back assembly can has a displacement of less than about 10 mm with a 400 N perpendicular load applied at a lateral center-point of seat back assembly within about 20 mm of the top of the seat.

This or any other aspect of the invention may be further characterized by one or any combination of the features described herein, such as the at least two diagonally extending support structure are substantially polymeric; the lower cross-seat member is substantially polymeric; the at least one strap reinforcement member is substantially metallic; the polymeric vertical support members at the top portion includes at least one head restraint locator; a top end of the at least two diagonally extending support structure is coextensive with the at least one head restraint locator; an air-permeable channel is formed between the at least one strap reinforcement member and the polymeric vertical support members; the at least one strap reinforcement member is at least partially a c-section and further at least a portion of the strap reinforcement member is adhesively connected to the polymeric vertical support members on at least two sides of the c-section.

Accordingly, pursuant to another aspect of the present invention, there is contemplated a molded plastic seat back assembly for a vehicle, comprising: at least two polymeric vertical support members including a top portion, a center portion, and a lower portion, wherein at least a portion of the polymeric vertical support members have a alternating wall section portion including a front wall section, a connective middle wall section and a back wall section; at least one cross-seat member connectively disposed between the polymeric vertical support members; at least one recliner bracket connectively disposed to the lower portion of the polymeric vertical support members for anchoring the molded plastic seat back assembly to a seat back recliner assembly; and at least one strap reinforcement member connected on to the polymeric vertical support members at least in the back wall section, wherein the molded plastic seat back assembly has a displacement of less than about 10.0 mm with at least a 400 N perpendicular load applied at a lateral center-point of seat back assembly within about 20 mm of the top of the seat and wherein the perpendicular load is at least partially transferred to the at least one recliner bracket via the at least two polymeric vertical support members and the at least one cross-seat member.

DETAILED DESCRIPTION OF THE PREFERRED EMBODIMENT

Referring to FIGS. 1 through 8, the present invention is premised upon the development of an improved vehicle seat back assembly 10 that defines a frame that supports a cushion material, houses seat comfort hardware (e.g. lumbar support, heat and/or cooling or ventilation, etc.), anchors (directly or indirectly) to the vehicle, and resists loads from occupants or other items in the vehicle during normal usage or impact events. In a preferred embodiment, the assembly 10 has at least two vertical support members 20, 40 (e.g. left and right side supports that optionally may be connected together as in FIG. 1) (which preferably are generally polymeric and are referred to as "polymeric vertical support members" in the description below, but may include one or more metallic components, such as reinforcements) including a top portion 22, 42 (e.g. left and right portions), a center portion 24, 44 (e.g. left and right portions), and a lower portion 26, 46 (e.g. left and right portions). The assembly 10 has at least one cross-seat member 30 (e.g. as a single piece) connectively disposed between the vertical support members 20, 40. The assembly 10 having at least one strap reinforcement member 50 connectively disposed on at least a portion of a back surface 28, 48, and on at least a portion of a side surface 29, 49 of one of the polymeric vertical support members 20, 40. Preferably, having two strap reinforcement members 50, 52 (e.g. left and right), one connectively disposed on each of the back surfaces 28, 48 respectively. It is contemplated that these strap reinforcements may aid in the overall stiffness of the seat back assembly and also may provide at least one wall of am air passage. The assembly 10 also has at least one recliner bracket connectively disposed to the lower portion 26, 46 (left, right or both) of the polymeric vertical support members for anchoring the seat back assembly 10 to a seat back recliner assembly (not shown).

Figure 4:
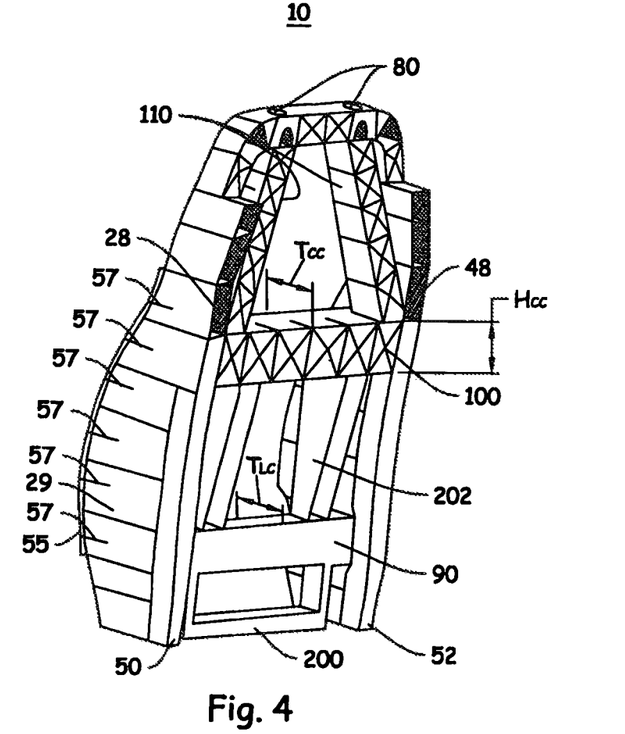
FIG. 4 is a perspective view from the back side of an illustrative multi-component seatback assembly according to the present teaching.
Figure 8:
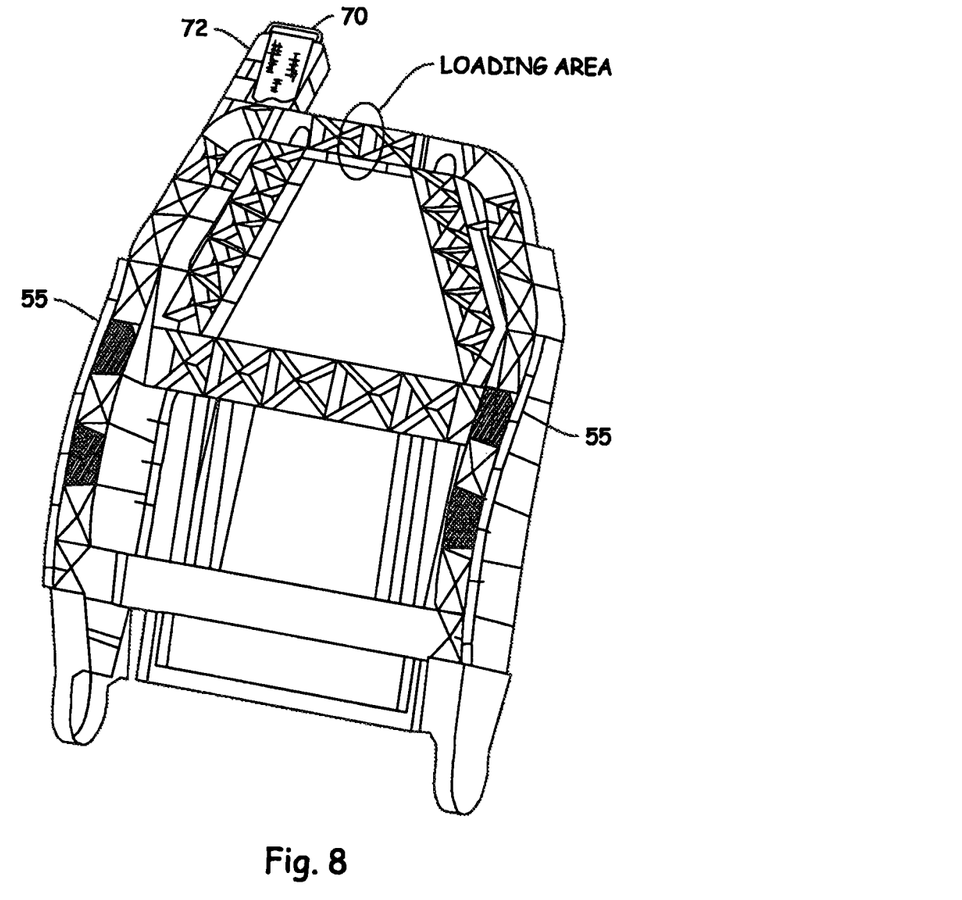
FIG. 8 is a perspective view of an illustrative seatback assembly according to the present teaching including a seat restraint tower.

It is contemplated that the at least two polymeric vertical support members 20, 40 may be formed as separate pieces (e.g. two or more) and joined along a portion of the top portion 22, 42 or they may be formed as a single unit. For example, it is possible that the two support members 20, 40 may not be directly joined, but are joined via the at least one cross-seat member 30. In a preferred embodiment, the vertical support members 20, 40 are formed as a unitary piece. Additionally, as illustrated in FIGS. 4 and 8, the support members preferably include an outwardly projecting flange 55 over at least a portion of the support members 20, 40. The flange 55 may also include a plurality of connecting gussets 57 that span between the flange 55 and the side surface 29 of the members 20, 40. In a preferred embodiment, there is at least one connecting gusset 57 per alternating wall section (discussed below) where the flange 55 is present.

For the sake of brevity, a single vertical support member is further described below, and it is contemplated that each of the vertical support members may be essentially a mirror image of each other, or be substantially identically configured functionally albeit of different dimensions or geometry. It is contemplated that in an optional case where a belted restraint 70 (e.g. seat belt) is integrated into the seat back assembly 10, the vertical support members may not be mirror images of each other. In this case, one of the vertical support members may include a restraint tower 72 to secure the restraint 70, as shown in FIG. 8.

Figure 3:
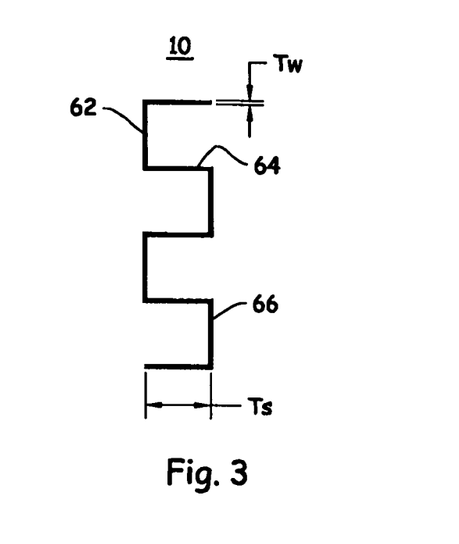
FIG. 3 is a side view the alternating wall section in the seatback panel according to the present teaching.

As seen in FIG. 3, it is contemplated that the polymeric vertical support member 20 may include an alternating wall section portion 60 at least along a portion of the top portion 22, the center portion 24, and the lower portion 26. By way of example, the alternating wall section portion 60 including a front wall section 62, at least one connective middle wall section 64 and a back wall section 66. The front wall section 62, middle wall section 64 and back wall section 66 may have a wall thickness ($T_W$) that ranges from about 0.5 mm to about 10.0 mm or more and may not be uniform along the walls. Optionally, these wall sections may also include reinforcement ribs or structures. In a preferred embodiment, the wall thickness ($T_W$) is greater in the middle wall section 64 (e.g. about 2.0 mm to about 10.0 mm) than in the front or back wall sections 62, 66 (e.g. about 0.5 mm to about 4.0 mm). For example, the ratio of the wall thickness of the middle wall section 64 to the front 62 or back 66 is about 4:1 to about 1:2.

The alternating wall sections combine to define a section thickness ($T_S$) of the polymeric vertical support member 20. The section thickness ($T_S$) may be constant or varied anywhere along the polymeric vertical support member 20 as required by the overall seat back assembly 10. In a preferred embodiment, the section thickness ($T_S$) is gradually varied from smaller dimension (e.g. about 20 mm to about 50 mm) in a lower portion 26 of the vertical support member 20, to larger middle section dimension (e.g. about 25 mm to about 70 mm) in the center portion 24, and back to a smaller dimension (e.g. about 15 mm to about 50 mm) in the top portion 22. For example, the section thickness along the length may increase from about 25% to about 350%. It may also be reduced to a thickness that is about the same as or smaller or larger than the middle section dimension. This varied sectional thickness generally occurs to aid in meeting packaging and/or load carrying requirements of the seat back assembly.

It is contemplated that the polymeric vertical support member 20 at the top portion 22 may include at least one head restraint locator 80. The head restraint locator 80 may be a though hole in the support member 20 or may be a separate component (not shown) that is attached to the support member 20. It may be a plastic or metal tower structure (e.g. a hollow tubular structure). The head restraint locator functions to hold a head restraint assembly (not shown) and to help transfer any loads that the head restraint assembly may be subjected to, into and through the seat back assembly 10. In a preferred embodiment, the cross-seat member includes a diagonal support portion 38 that is at least partially connected to the top portion 20 at or near (e.g. within about 15 mm) the head restraint locator 80. Preferably, the head restraint assembly loads may be transferred though the seat (and ultimately to the vehicle), at least partially, through the diagonal support portion.

Where the seat back assembly 10 includes an integrated belted restraint 70, the polymeric vertical support member 20 may include the restraint tower 72, as shown in FIG. 8. This tower 72 may protrude from the top portion 22 of the polymeric vertical support members 20. In this embodiment, it is contemplated that, along with the cross-seat member 30 discussed below, a restraint cross-seat member 74 may be connectively disposed between the tower 72 and the opposite vertical support member 40, at the lower portion 46.

Optionally, the polymeric vertical support member 20 may also include an area for mounting an air bag module. Typically, this may be located within the center portion 24.

It is contemplated that the polymeric vertical support member 20 is formed by any number of molding techniques (e.g. injection, RIM, blow, compression, injection/compression, or the like). In a preferred embodiment, the polymeric vertical support member 20 is formed with an injection molding operation.

It is contemplated that the polymeric vertical support member 20 is essentially a polymeric material (e.g. thermoplastic or thermoset). The materials selected for forming the walls of the seat backs of the present invention preferably exhibit an elastic modulus ranging from about 500 MPa to about 6000 Mpa, and more preferably about 1300 to about 1500 Mpa, and still more preferably about 1700 to about 2500 MPA.

The preferred flexural modulus will be at least about 600 MPa, more preferably it will range from about 200 to about 500 ksi (1300 to about 3500 MPa), and still more preferably about 250 to about 350 ksi (1700 to about 2500 MPa).

The preferred yield strength of the material ranges from about 20 to about 200 Mpa. More preferably it will range from about 25 to about 70 MPa and still more preferably about 35 to about 55 Mpa. Moreover, the ductility (as measured by percent elongation) of the material preferably ranges from about 20% to about 150%, and more preferably it ranges from about 30% to about 100% and still more preferably, it ranges from about 45% to 60%.

The material also will preferably exhibit attractive processing characteristics, such as a melt flow rate (230° C./3.8 kg-I; according to ASTM D1238) of about 0.300 to about 5.0 g/10 min to about 0.900 to about 3 g/10 min; a softening point (according to ASTM D1525) of less than about 180° C., and more preferably about 90° C. to about 150° C.; linear-flow mold shrink (according to ASTM D 955) of about 0.076 mm/mm (0.003 in/in) about 0.203 mm/mm (0.008 in/in) and more preferably about 0.152 mm/mm (0.006 in/in) to about 0.178 mm/mm (0.007 in/in); or a combination of these properties.

Accordingly, in one preferred embodiment, the seat back assembly 10 of the present invention preferably is made from a plastic material, and more preferably a thermoplastic material. In a particularly preferred embodiment, the seat back is made from a high strength thermoplastic resin selected from styrenics, polyamides, polyolefins, polycarbonates, polyesters or mixtures thereof. Still more preferably they are selected from the group consisting of acrylonitrile butadiene styrene, polycarbonate/acrylonitrile/butadiene styrene, polycarbonate, polyphenylene oxide/polystyrene, polybutylene terephthalate, polybutylene terephthalate/polycarbonate, polyamide (e.g., nylon), polyesters, polypropylene, polyethylene, and mixtures thereof.

Additionally, in another preferred embodiment, the seat back assembly 10 (e.g. the vertical support members 20, some or all of the cross-seat members 30, or both) of the present invention is made from a plastic material and processing method that is described in WO/2006/047366, herein incorporated by reference. Wherein the material described is premised upon the recognition for use as multiple layer elongated member of a propylene-based (e.g., a propylene-ethylene copolymer, a propylene-a-olefin copolymer, mixtures thereof or otherwise) copolymer that has a melting point that is below an adjoining polypropylene layer, and specifically an oriented polypropylene layer. Upon processing to form articles, the resulting materials (especially the oriented polypropylene layer) exhibits a degree of retained morphology from its initial drawn state heretofore not attainable using conventional materials. Accordingly, aspects of the material are premised upon the use of a propylene-ethylene copolymer that has an ethylene content of about 3 to about 25 wt. % (e.g., 5 to 15 wt. %), a melting range of about 50 to about 135° C., and a flexural modulus of about 8 to about 325 Mpa or higher (e.g., at least about 375 MPa), and a second thermoplastic material that includes a polyolefin, such as a propylene-based polymer. Such propylene-ethylene copolymer may have a Shore A Hardness of from about 40 to 90 (or higher), a molecular weight distribution of about 1.5 to about 4, and a melt flow rate of at least about 0.3 g/10 min, or any combination thereof.

Cross-Seat Member

It is contemplated that the at least one cross-seat member 30 may be fabricated as a single piece or alternatively as two or more pieces. The cross-seat member 30 may include a center portion 34, a lower portion 36 and at least two diagonal support portions 38. The cross-seat member center portion 34 connectively disposed between the polymeric vertical support members 20, 40 at the center portion 24, 44 of the polymeric vertical support members 20, 40. At least two cross-seat member diagonal support portions 38 connectively disposed between the polymeric vertical support members 20, 40 at the top portion 22, 42 and the center portion 24, 44 of the polymeric vertical support members at or below the interface of the center cross-seat member center portion 34 and the polymeric vertical support members 20, 40. The cross-seat member lower portion 36 connectively disposed between the polymeric vertical support members 20, 40 at the lower portion 26, 46 of the polymeric vertical support members 20, 40.

Figure 1:
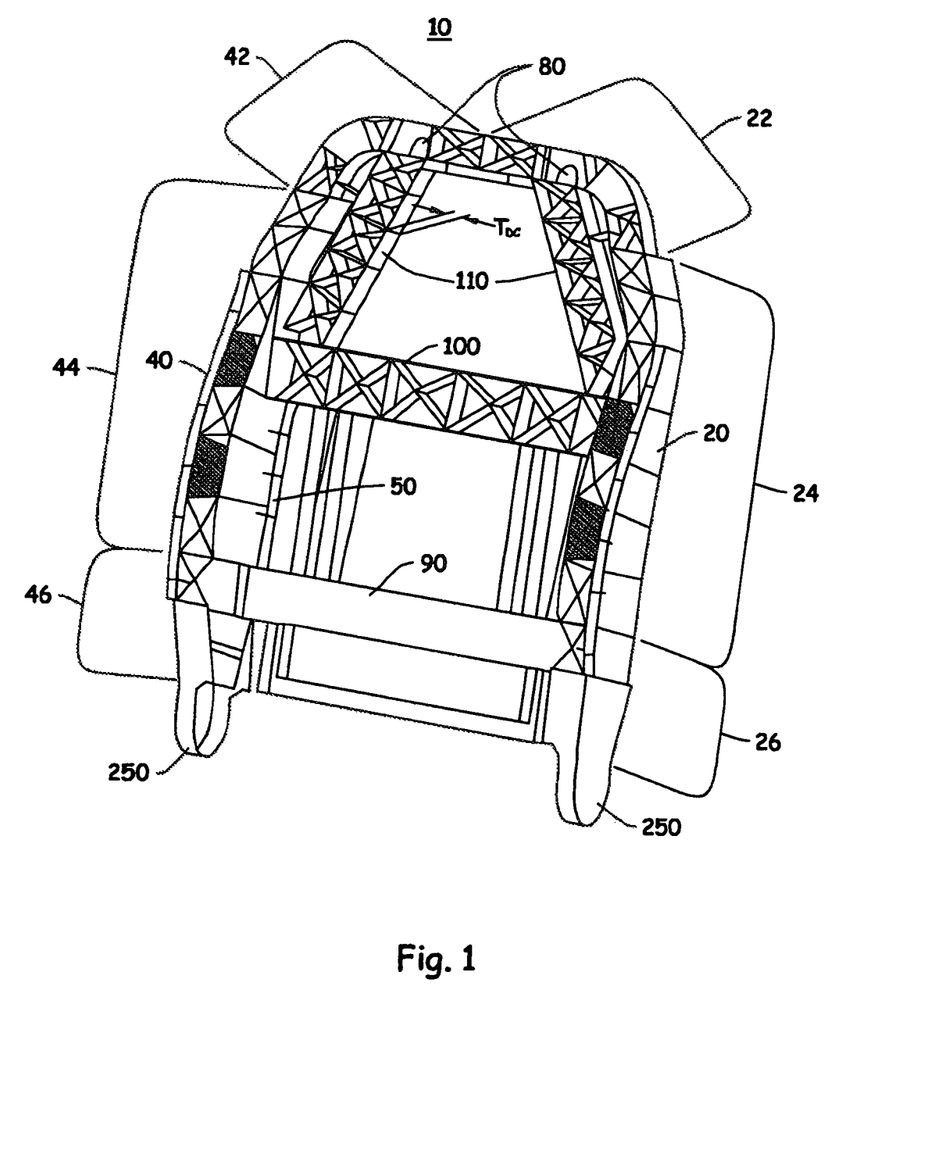
FIG. 1 is a perspective view of an illustrative seatback assembly according to the present teaching.
Figure 2:
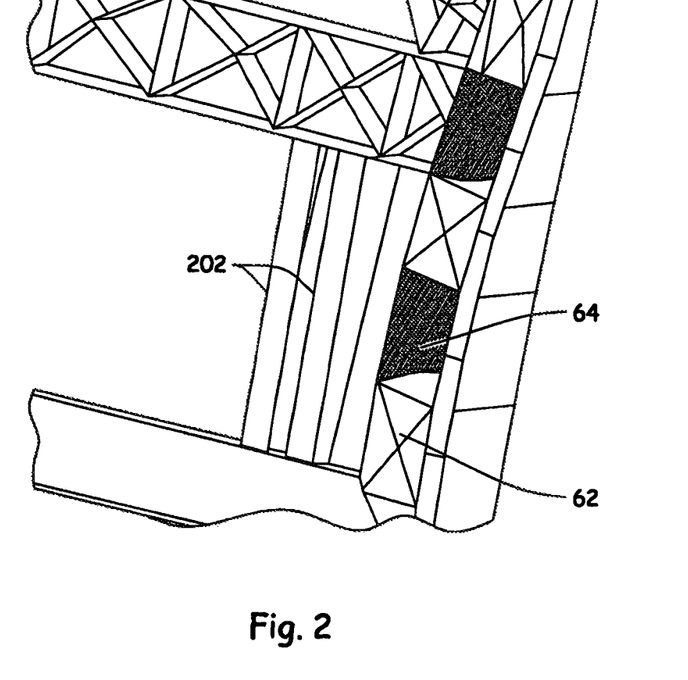
FIG. 2 illustrates a perspective sectional view (close-up) of an illustrative seatback assembly according to the present teaching.

In a preferred embodiment, as shown in FIGS. 1 and 4, the cross-seat member 30 may be constructed multiple pieces, although it is contemplated that any or all of these may be combined into one, two or three pieces. These pieces may be constructed of similar or dissimilar materials. These pieces may be secured to the polymeric vertical support members 20, 40 in any number of fashions (e.g. adhesively secured, mechanically secured, or any combination thereof), but preferably via an adhesive joint.

A lower cross-seat member 90 may be connectively disposed between the polymeric vertical support members 20, 40 at the lower portion 26, 46 of the polymeric vertical support members 20, 40. The lower cross-seat member 90 may be have a cross sectional shape that is tubular, square, rectangular, I-beam, C-section including ribbing, or any combination thereof. It may have a sectional thickness ($T_{lc}$) of about 5.0 mm to 50.0 mm, preferably from about 10.0 mm to about 35.0 mm, and most preferably from about 15.0 mm to about 25.0 mm. It may have a sectional height ($H_{lc}$) of about 5.0 mm to 80.0 mm, preferably from about 10.0 mm to about 55.0 mm, and most preferably from about 25.0 mm to about 40.0 mm. In a preferred embodiment, the lower cross-seat member 90 may be adhesively secured to the polymeric vertical support members 20, 40 at or near (e.g. within about 20.0 mm) the back wall section 66.

Optionally, the lower cross-seat member 90 may include features and/or additional pieces (e.g. a lower trim bar 200, a suspension straps 202) that may aid in the ability of the seat assembly 10 to perform other functions. For example, one or more structural features may be included for receiving a member that attaches a trim cover to the seat, for providing a connection point for a seat back panel, providing an attachment for a seat suspension, or any combination thereof.

A center cross-seat member 100 may be connectively disposed between the polymeric vertical support members 20, 40 at the center portion 24, 44 of the polymeric vertical support members 20, 40. The center cross-seat member 100 may be have a cross sectional shape that is tubular, square, rectangular, I-beam, C-section including ribbing, or any combination thereof. It may have a sectional thickness ($T_{CC}$) of about 10.0 mm to 50.0 mm, preferably from about 15.0 mm to about 35.0 mm, and most preferably from about 20.0 mm to about 25.0 mm. It may have a sectional height ($H_{CC}$) of about 5.0 mm to 80.0 mm, preferably from about 10.0 mm to about 55.0 mm, and most preferably from about 25.0 mm to about 40.0 mm. In a preferred embodiment, the center cross-seat member 100 may be adhesively secured to the polymeric vertical support members 20, 40 at or near (e.g. within about 20.0 mm) the back wall section 66.

At least one diagonally extending support structure 110 connectively may be disposed between the polymeric vertical support members 20, 40 at the top portion 22, 42 and the center portion of the polymeric vertical support members 20, 40 at or below the interface of the center cross-seat member 100 and the polymeric vertical support members 20, 40. Preferably, there are at least two diagonally extending support structure 110 (left and right) interface the top portion 22, 42 at (collocated with) or near (within about 20.0 mm of) the at least one head restraint locator 80. At least when a head restraint is present, the diagonally extending support structures 110 may be adapted to allow a head restraint adjustment rod to pass through the members 110.

The diagonally extending support structure 110 may be have a cross sectional shape that is tubular, square, rectangular, I-beam, C-section including ribbing, or any combination thereof. There also may be only one support structure that It may have a sectional thickness ($T_{dc}$) of about 10.0 mm to 50.0 mm, preferably from about 15.0 mm to about 35.0 mm, and most preferably from about 20.0 mm to about 25.0 mm. It may have a sectional height ($H_{dc}$) of about 5.0 mm to 80.0 mm, preferably from about 10.0 mm to about 55.0 mm, and most preferably from about 25.0 mm to about 40.0 mm. In a preferred embodiment, the center cross-seat member 100 may be adhesively secured to the polymeric vertical support members 20, 40 at or near (e.g. within about 20.0 mm) the back wall section 66.

It is contemplated that the cross-seat member (e.g. as a multiple pieces or as a single piece construction) may be comprised of a polymeric material, a metallic material, or any combination thereof. Preferred polymeric materials contemplated are the same as discussed above (e.g. for the polymeric vertical support member 20). Preferred metallic materials include steel, magnesium, aluminum, nickel, or any combination thereof. Polymeric forming processes contemplated are similar to those discussed above (e.g. for the polymeric vertical support member 20). Metallic forming processes contemplated include stamping, roll-forming, casting, machining, and the like.

It is contemplated that the seat back assembly 10 includes at least one recliner bracket 250 that may be connectively disposed to the lower portion 26, 46 of the polymeric vertical support members 20, 40 for anchoring the seat back assembly 10 to a seat back recliner assembly (not shown). The recliner bracket 250 may be mechanically (e.g. via screws, nut and bolt, rivets, or the like) connected, adhesively connected, or both to the polymeric vertical support members 20, 40. In a preferred embodiment, an adhesive is utilized. Preferably the adhesive covers about 10% to about 100%, more preferably about 25% to 80%, and most preferably about 35% to 65% of the interface area of the bracket 250 and the support members 20, 40. It is contemplated that the adhesive may be applied in a continuous bead or non-continuous bead. The recliner bracket may be comprised of a metallic or polymeric material, preferably from high strength steel commonly used in these types of applications.

Strap Reinforcement

Figure 5:
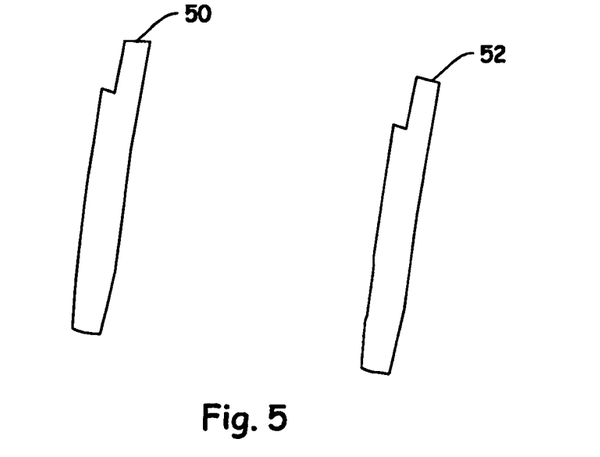
FIG. 5 illustrates the strap reinforcement member of the seatback in FIG. 4.
Figure 6:
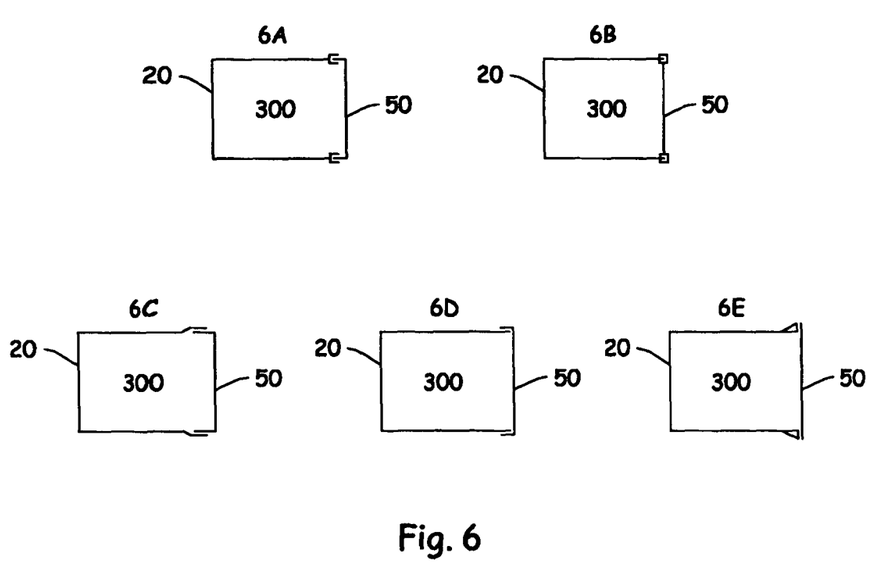
FIGS. 6A-E are side views of illustrative adhesive joints in the seatback assembly according to the present teaching.
Figure 7:
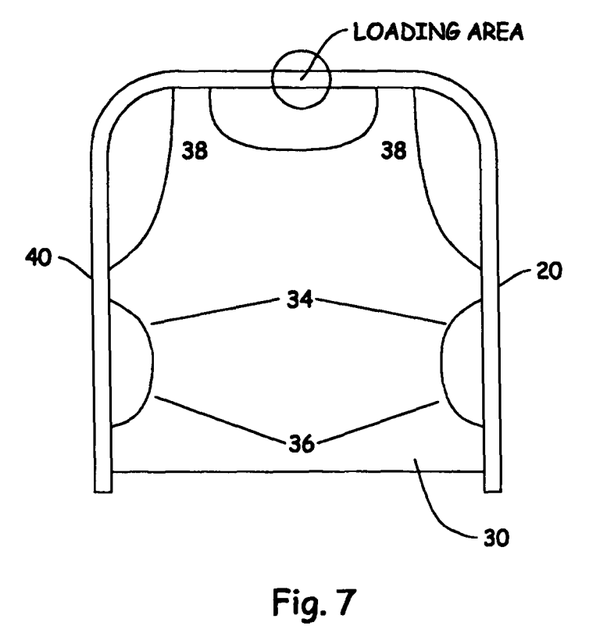
FIG. 7 is a plan view of another illustrative seatback panel according to the present teaching.

It is contemplated that the seat back assembly 10 includes at least one strap reinforcement member 50, 52, as shown in FIGS. 4 and 5, connected on to the polymeric vertical support member 20, 40. The strap reinforcement member 50, 52 may interface the polymeric vertical support member 20, 40 at least in a portion of the back surface 28, 48, although preferably in a portion of the side surface 29, 49 as well. The at least one strap reinforcement member 50, 52 may span a portion of the lower portion of the polymeric vertical support members 20, 40 to a portion of the center portion of the polymeric vertical support members 20, 40 or even higher. Preferably, the at least one strap reinforcement member 50, 52 may span from at least the area where the recliner bracket 200 is connected to the seat back assembly 10 up to the area where the center cross-seat member 100 is connected to the seat back assembly 10.

The strap reinforcement member 50, 52 may have a profile that is flat, shaped or both. It is contemplated that the strap reinforcement member 50, 52 may provide additional stiffness and/or control load distribution to and through the seat back assembly, thus it is preferred that a shaped profile is utilized. One example, as seen in FIG. 5, at least part of the strap 50, 52 includes a c-section profile. It should be appreciated that other formations (e.g. stiffening beads, gussets, or the like) to enhance stiffness and/or control load distribution are possible.

The strap reinforcement member 50, 52 in combination with the vertical support members 20, 40 may also create an air channel 300 through which air may be transported. This may be via a connection from the vehicle HVAC system into the seat back assembly 10 and exiting the seat back assembly via exit portals. This may function to provide air flow to the area behind the seat back assembly.

It is contemplated that the strap reinforcement member 50, 52 may be comprised of a polymeric material, a metallic material, or any combination thereof. Preferred polymeric materials contemplated are the same as discussed above (e.g. for the polymeric vertical support member 20). Preferred metallic materials may include steel, magnesium, aluminum, nickel, or any combination thereof. Polymeric forming processes contemplated are similar to those discussed above (e.g. for the polymeric vertical support member 20). Metallic forming processes contemplated include stamping, roll-forming, casting, machining, and the like.

Referring to FIGS. 6A-E, it is contemplated that where adhesive joints are present in the current invention, a number of joint designs are possible. Examples of suitable joints, as seen in FIGS. 6A-E, include butt joints, lap joints, tongue in groove joints or the like. Preferably, the adhesive joints at least partially join the two components in more than one plane, thereby reducing the risk of a peal type joint failure. It is also contemplated that mechanical joining features and/or techniques (e.g. snap features, rivets, screws, etc.) may be used in combination with the adhesive. Preferably these mechanical joining features at least temporarily hold the components together, allowing the adhesive to cure. Further examples of joint designs can be seen in U.S. Pat. No. 6,739,302 incorporated by reference for all purposes.

The adhesive contemplated by the present invention may be a structural adhesive and preferably is a curable on demand material. Any adhesive that after cure can withstand the conditions of use of a vehicle interior can be used. Preferably such adhesive does not decompose or delaminate at temperatures of up to about 138° C., more preferably up to about 143° C., even more preferably up to about 160° C. and most preferably up to about 191° C. The adhesive used may be curable (curable on demand) via a variety of known mechanisms including heat cure, infrared cure, ultraviolet cure, chemical cure, radio frequency cure, solvent loss, and moisture cure.

While many adhesive families are contemplated as well (e.g., urethanes, acrylics, silanes, or the like), preferably the adhesive is an epoxy resin, a polyimide, a hi-bred polyimide/epoxy resin adhesive or an epoxy novolac/nitrile rubber adhesive. Preferred adhesives are the high temperature epoxy resin adhesives. High temperature epoxy resin adhesive means an adhesive wherein the primary component is an epoxy resin which when cured can withstand exposure to the temperatures mentioned above without decomposing or delaminating from the substrate. Examples of commercially available adhesives are Dow bisphenol liquid epoxy resins.

As will be appreciated from the above, preferred seating systems that are optimized in accordance with the criteria outlined herein, and using the referenced materials, consistently should pass United States and European government test standards for motor vehicles (e.g., as addressed in FMVSS 202, FMVSS 207, FMVSS 210, FMVSS 225 (49 CFR 571.202, 0.207, 0.210, 0.225) or ECE 17; all such standards being expressly incorporated by reference herein) as well as the requirements of automobile original equipment manufacturers and their suppliers.

The present invention contemplates techniques and methods for the optimization of one or more of substrate material selection, wall thickness, and section thickness for realizing the desired stiffness and strength to meet traditionally demanding load requirements in automotive vehicles occasioned of head restraint loads, shoulder belt loads, child seat anchor loads, or cargo intrusion. The skilled artisan will recognize, however, that from application to application, design requirements will vary, and therefore a reasonable amount of experimentation may be needed to adapt the various teachings to the unique intended environment. By way of example, part size, seat belt location, hinge points, latch locations, and split ratio may affect final design. It is believed that the use of conventional computer aided engineering (CAE) techniques in combination with the present teachings will yield satisfactory results, which can be improved as desired with conventional techniques for localized steel reinforcement (e.g., in high stress areas, such as hinge points, hear restraint areas, seat belt mounting areas, and armrest support areas).

Any examples or embodiments presented above should not be considered limiting as to the scope of the current invention and the relative dimensions of the illustrative seat back assembly can be larger, smaller or both depending on the packaging restraints of the polymeric system being monitored. The structure may be employed for applications beyond the scope of the examples, as taught throughout. Conditions specified in this example may also be varied by +/- 10%, 20%, 30% or more and remain within the teachings herein. One or more of dimensions illustrated likewise may vary by +/- 10%, 20%, 30% or higher. Relative proportions even if not specified herein are also contemplated within the present teachings.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially" of to describe a combination shall include the elements, ingredients, components or steps identified, and such other elements ingredients, components or steps that do not materially affect the basic and novel characteristics of the combination.

The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

What is claimed is:

1. A molded plastic seat back assembly for a vehicle, comprising:
   a. at least two polymeric vertical support members including a top portion, a center portion, and a lower portion, wherein at least a portion of the polymeric vertical support members have an alternating wall section portion including a front wall section, a connective middle wall section, and a back wall section;
   b. at least one cross-seat member connectively disposed between the polymeric vertical support members that includes:
      1. cross-seat member center portion connectively disposed between the polymeric vertical support members at the center portion of the polymeric vertical support members;
      2. at least two cross seat member diagonal support portions connectively disposed between the polymeric vertical support members at the top portion and the center portion of the polymeric vertical support members at or below an interface section of the center cross-seat member center portion and the polymeric vertical support members; and
      3. a cross-seat member lower portion connectively disposed between the polymeric vertical support members at the lower portion of tie polymeric vertical support members;
   c. at least one recliner bracket connectively disposed to the on of the polymeric vertical support members for anchoring the molded plastic seat back assembly to a seat back recliner assembly; and
   d. at least one strap reinforcement member connected on the polymeric vertical support members at least in the back wall section, wherein the at least one strap reinforcement member spans a portion of the lower portion of the polymeric vertical support members to a portion of the center portion of the polymeric vertical support members.

2. The seat back assembly of claim 1, wherein the at least one cross-seat member is substantially polymeric.

3. The seat back assembly of 1, wherein the molded plastic seat back assembly has a displacement of less than about 10.0 mm with a 400 N perpendicular load applied at a lateral center-point of the seat back assembly within about 20 mm of a top of the seat.

4. The seat back assembly of claim wherein the at least one strap reinforcement member s substantially metallic.

5. The seat back: assembly of claim 1, wherein the at least one strap reinforcement member is connected to the polymeric vertical support members by an adhesive.

6. The seat back assembly of claim 1, wherein the polymeric vertical support members at the top portion include at least one head restraint locator.

7. The seat back assembly of claim 6, wherein a top end of the at least two diagonally extending support structures is coextensive with the at least one head restraint locater.

8. The seat back assembly of claim 1, wherein an air-permeable channel is formed between the at least one strap reinforcement member and the polymeric vertical support members.

9. The seat back assembly of claim 1, wherein the at least one strap reinforcement member is at least partially a c-section and further wherein at least a portion of the strap reinforcement member is adhesively connected to the polymeric vertical support members on at least two sides of the c-section.

10. An injection molded plastic seat back assemble for an automotive vehicle comprising:
   a. at least two polymeric vertical support members including a top portion, a center portion, and a lower portion, wherein at least a portion of the polymeric vertical support members have an alternating wall section portion including a front wall section, a connective middle wall section, and a back wall section;
   b. a center cross-seat member connectively disposed between the polymeric vertical support members at the center portion of the polymeric vertical support members;
   c. at least two diagonally extending support structure connectively disposed between the polymeric vertical support members at the top portion and the center portion of the polymeric vertical support members at or below an interface section of the center cross-seat member and the polymeric vertical support members;
   d. a lower cross-seat member connectively disposed between the polymeric vertical support members at the lower portion of the polymeric vertical support members;
   e. at least one recliner bracket connectively disposed to the lower portion of the polymeric vertical support members for anchoring the injection molded plastic seat back assembly to a seat back recliner assembly; and
   f. at least one strap reinforcement member adhesively connected on to the polymeric vertical support members at least in the back wall section, wherein the at least one strap reinforcement member spans a portion of the lower portion of the polymeric vertical support members to a portion of the center portion of the polymeric vertical support members;

wherein the injection molded plastic seat back assembly has a displacement of less than about 10.0 mm with a 400 perpendicular load applied at a lateral centerpoint of the seat back assembly within about 20 mm of a top of the seat.

11. The seat back assembly of claim 10, wherein the at least two diagonally extending support structures are substantially polymeric.

12. The seat back assembly of claim 10, wherein the lower cross-seat member is substantially polymeric.

13. The seat back assembly of claim 10, wherein the at least one strap reinforcement member is substantially metallic.

14. The seat back assembly of claim 10, wherein the polymeric vertical support members at the top portion include at least one head restraint locator.

15. The seat back assembly of claim 14, wherein a top end of the at least two diagonally extending support structures is coextensive with the at least one head restraint locator.

16. The seat back assembly of claim 10, wherein an airpermeable channel is formed between the at least one strap reinforcement member and the polymeric vertical support members.

17. The seat back assembly of claim 10, wherein the at least one strap reinforcement member is at least partially a c-section and further wherein at least a portion of the strap reinforcement member is adhesively connected to the polymeric vertical support members on at least two sides of the c-section.

18. A molded plastic seat back assembly for a vehicle comprising:
   a. at least two polymeric vertical support members including a top portion a center portion and a lower portion wherein at least a portion of the polymeric vertical support members have an alternating wall section portion including a front wall section a connective middle wall section, and a back wall section;
   b. at least one cross-seat member connectively disposed between the polymeric vertical support members;
   c. at least one recliner bracket connectively disposed to the lower portion of the polymeric vertical support members for anchoring the molded plastic seat back assembly to a seat back recliner assembly; and
   d. at least trap reinforcement member connected on to the polymeric vertical support members at least in the back wall section, wherein the at least one strap reinforcement member spans a portion of the lower portion of the polymeric vertical support members to a portion of the center portion of the polymeric vertical support members;

wherein the molded plastic seat back assembly has a displacement of less than about 10.0mm with at least a 400 N perpendicular load applied at a lateral centerpoint of the seat back assembly within about 20mm of a top of the seat and wherein the perpendicular load is at least partially transferred to the at least one recliner bracket via the at least two polymeric vertical support members and the at least one cross-seat member.

* * * * *

UNITED STATES PATENT AND TRADEMARK OFFICE
CERTIFICATE OF CORRECTION

| | |
|---|---|
| PATENT NO. | : 8,511,748 B2 |
| APPLICATION NO. | : 12/992191 |
| DATED | : August 20, 2013 |
| INVENTOR(S) | : McLeod et al. |

It is certified that error appears in the above-identified patent and that said Letters Patent is hereby corrected as shown below:

On the Title page Inventors: delete "Mostaffa Ahmed, Rochester Hills, MI (US)" insert --"Mustafa Ahmed, Rochester Hills, MI (US)"--

In the Claims

Claim 1, Column 11, Line 49, insert --a-- as the first word after "1."
Claim 1, Column 11, line 53, insert -- - -- between "cross" and "seat"
Claim 1, Column 11, Line 62, delete "tie" and insert --the--
Claim 1, Column 11, Line 64, delete "on", insert --lower portion--
Claim 1, Column 12, Line 1, insert --to-- after "connected on"
Claim 4, Column 12, Line 16, insert --1,-- between "claim" and "wherein"
Claim 4, Column 12, Line 17, after "member" delete "s" insert --is--
Claim 5, Column 12, Line 18, delete ":" after "back"
Claim 10, Column 12, Line 38, delete "assemble" insert --assembly--
Claim 10, Column 13, Line 6, insert --N-- after "400"
Claim 18, Column 14, Line 1, insert --,-- after "vehicle"
Claim 18, Column 14, Line 4, insert --,-- after "a top portion", "a center portion", and "a lower portion"
Claim 18, Column 14, Line 8, insert --,-- after "front wall section"
Claim 18, Column 14, Line 16, delete "trap" insert --one strap--

Signed and Sealed this
Fifteenth Day of October, 2013

Teresa Stanek Rea
*Deputy Director of the United States Patent and Trademark Office*